United States Patent [19]

Güeldenpfennig et al.

[11] 3,825,692

[45] July 23, 1974

[54] SIMPLIFIED CONFERENCE FACILITY FOR PBX

[75] Inventors: Klaus Güeldenpfennig, Penfield; Uwe A. Pommerening, Webster; Stanley L. Russell, West Webster, all of N.Y.

[73] Assignee: Stromberg-Carlson Corporation, Rochester, N.Y.

[22] Filed: Sept. 29, 1972

[21] Appl. No.: 293,379

[52] U.S. Cl. .......... 179/18 BC

[51] Int. Cl. .......... H04m 3/56

[58] Field of Search .......... 179/18 BC

[56] References Cited

UNITED STATES PATENTS

| | | | |
|---|---|---|---|
| 3,384,717 | 5/1968 | Coston | 179/18 BC X |
| 3,497,631 | 2/1970 | Pearce et al. | 179/18 BC |

*Primary Examiner*—Thomas W. Brown

*Attorney, Agent, or Firm*—Donald R. Antonelli; William F. Porter, Jr.

[57] ABSTRACT

In an automatic private branch exchange where an operator may effect connection of a subscriber to a trunk circuit by connecting to an available register, inserting into the register the identity of the subscriber line circuit and forwarding a switch mark to the trunk from the register when the line circuit has been marked so that the trunk may acquire the services of the junctor control to complete its connection to the line circuit, a conference facility is made possible by controlling connection of the trunk to the junctor control directly from the switch mark without inhibition even when the trunk is already connected to another subscriber.

6 Claims, 8 Drawing Figures

SIMPLIFIED CONFERENCE FACILITY FOR PBX

The present invention relates in general to telephone systems, and more particularly to a private automatic branch exchange having a simplified conference facility which makes possible the connection of multiple subscribers within the system through a single trunk circuit.

In our copending U.S. Pat. application Ser. No. 293,518, filed Sept. 28, 1972, entitled "Private Automatic Branch Exchange," and assigned to the same assignee as the present application, we have disclosed an electronic private automatic branch exchange system having a capacity for automatically processing calls in connection with a large, substantially unlimited, number of subscriber stations. In order to obtain a system of this type, the characteristic equipment of a private automatic branch exchange was combined with the switching equipment of a central office to provide an exchange of substantially unlimited size. The central office portion of the equipment in that system was provided in the form of an electronic switching central having the characteristic line link network for selectively connecting one of a plurality of subscriber stations via a junctor circuit and service link network to one of a plurality of local registers. A trunk link network was also provided for effecting termination of the calls from the junctor circuits back through the line link network to a terminating subscriber or out through a trunk circuit to the outside world.

The private automatic branch exchange portion of the system disclosed in our copending application included an operator service link network providing access to one of a plurality of operator position circuits from the trunk circuits, which might include universal trunks, attendant trunks and operator access trunks. The operator service link network also effects the necessary connection of the universal trunks through an available dial pulse acceptor to an incoming register in the case of direct inward dialed calls and also provides for connection of subscribers to the operator position circuits from which the subscribers may be connected by the operator to other subscriber circuits within the system or to the outside world.

In the copending U.S. Pat. application Ser. No. 293,571, filed Sept. 29, 1972, entitled "Trunk Circuit," of Klaus Gueldenpfennig and Stanely L. Russell, which is assigned to the same assignee as the present application, there is disclosed a universal trunk circuit which may be used in the automatic branch exchange disclosed in the aforementioned copending application as an incoming/outgoing trunk circuit, an attendant trunk circuit or an operator access trunk. As an attendant trunk, the trunk circuit provides a junctor port and a trunk port connected to respective sides of the trunk link network and as an access trunk the trunk circuit provides a pair of junctor ports connected to the junctor side of the trunk link network.

In the automatic branch exchange, an inside subscriber may be connected to an operator by dialing a special digit, such as "0," in response to which the system will effect connection of the subscriber line circuit through the trunk link network, an available attendant trunk, the operator service link network to an available operator position circuit. The subscriber may then request that the operator connect him to another inside subscriber within the system. This is accomplished by the operator obtaining the services of a local register through the service link network and dialing the number of the requested subscriber, in response to which the system will effect connection of that subscriber through the same attendant trunk to the original subscriber, at which time the operator may remain connected to the trunk or may release from the connection by depressing a release key. The present invention relates to the provision of a very simplified conference arrangement which is based upon the ability of the operator to connect a line circuit to an attendant or access trunk either on her own initiative or at the request of another subscriber. In this regard, the present invention makes it possible for the operator to repeatedly connect subscribers to a single trunk circuit so as to provide a conference facility which does not require an additional special features circuit within the system specifically to handle conference calls.

When a line circuit is connected through a junctor to a register in a normal ESC and all of the information concerning the requested connection is received in the local register, a line circuit or outgoing trunk circuit designated by the received information will be marked and the register will return a switch signal to the junctor control requesting connection of the junctor through the trunk link network to the requested line circuit or selected trunk circuit. At the end of the switch signal, the register automatically gets disconnected from the junctor, eliminating the possibility of effecting a second connection under control of that register or of recalling the register to effect a second connection to the line circuit which might make a conference connection possible. However, in a PBX arrangement having an operator facility, the situation is different. When the operator establishes a call she first pushes a start button to gain access to a local register through the service link network through her own position circuit with a separate interface, and then she puts the information into the local register, in response to which the designated line circuit is marked and a switch signal is returned to the operator position circuit from which it is forwarded through the operator service link network to an attendant trunk or access trunk to permit connection of the selected line circuit to the operator through the trunk link network. As before, when the switch signal from the local register disappears, the register will drop out; however, the operator remains connected to the designated line circuit through the trunk circuit. Thus, providing neither the trunk circuit nor the operator position circuit includes circuitry to prevent multiple connection of line circuits to the particular trunk circuit, the operator can repeatedly call for a register by pressing a start key on her console, insert information into the register concerning another line circuit, and effect connection of that line circuit to the same trunk circuit to which the operator position circuit has accessed. In this way, a conference facility can be provided in a very simple and inexpensive manner.

It is an object of the present invention to provide a private automatic branch exchange which includes a simplified conference facility.

It is a further object of the present invention to provide a telephone exchange of the type described which makes possible the connection of multiple line circuits through a single trunk circuit to permit conference communication.

It is still another object of the present invention to provide a conference facility within a private automatic branch exchange which does not require the provision of a special features circuit for conference calls within the system.

It is still another object of the present invention to provide a private automatic branch exchange wherein a conference facility may be established under control of the operator in a very simplified and inexpensive manner.

These and other objects, features and advantages of the present invention will become more apparent from the following detailed description thereof, when taken with the accompanying drawings, wherein:

FIGS. 1–3, when combined in numerical order, provide a schematic block diagram of the automatic branch exchange in which the present invention may be utilized;

GENERAL SYSTEM DESCRIPTION

Figure 1:
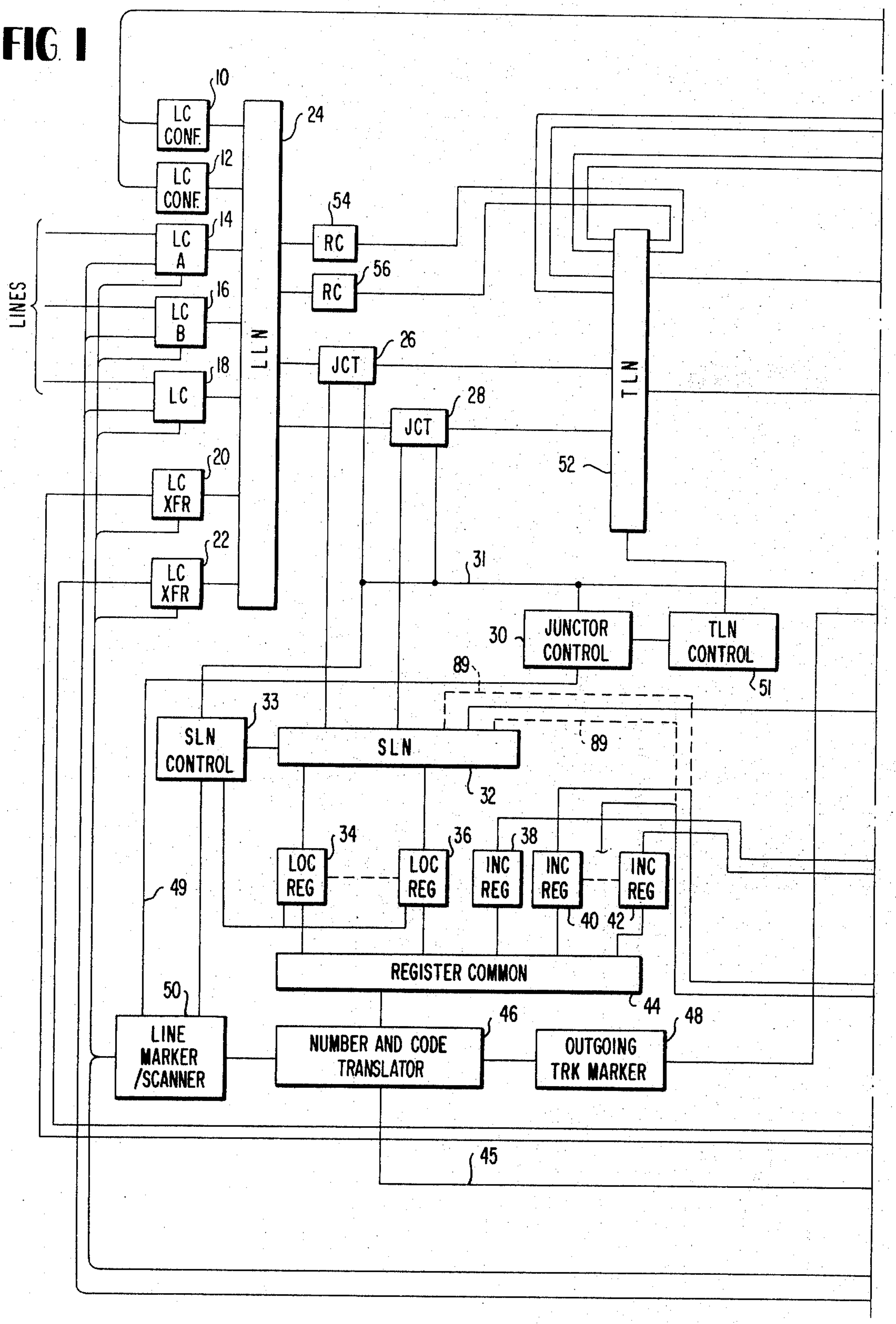
Figure 2:
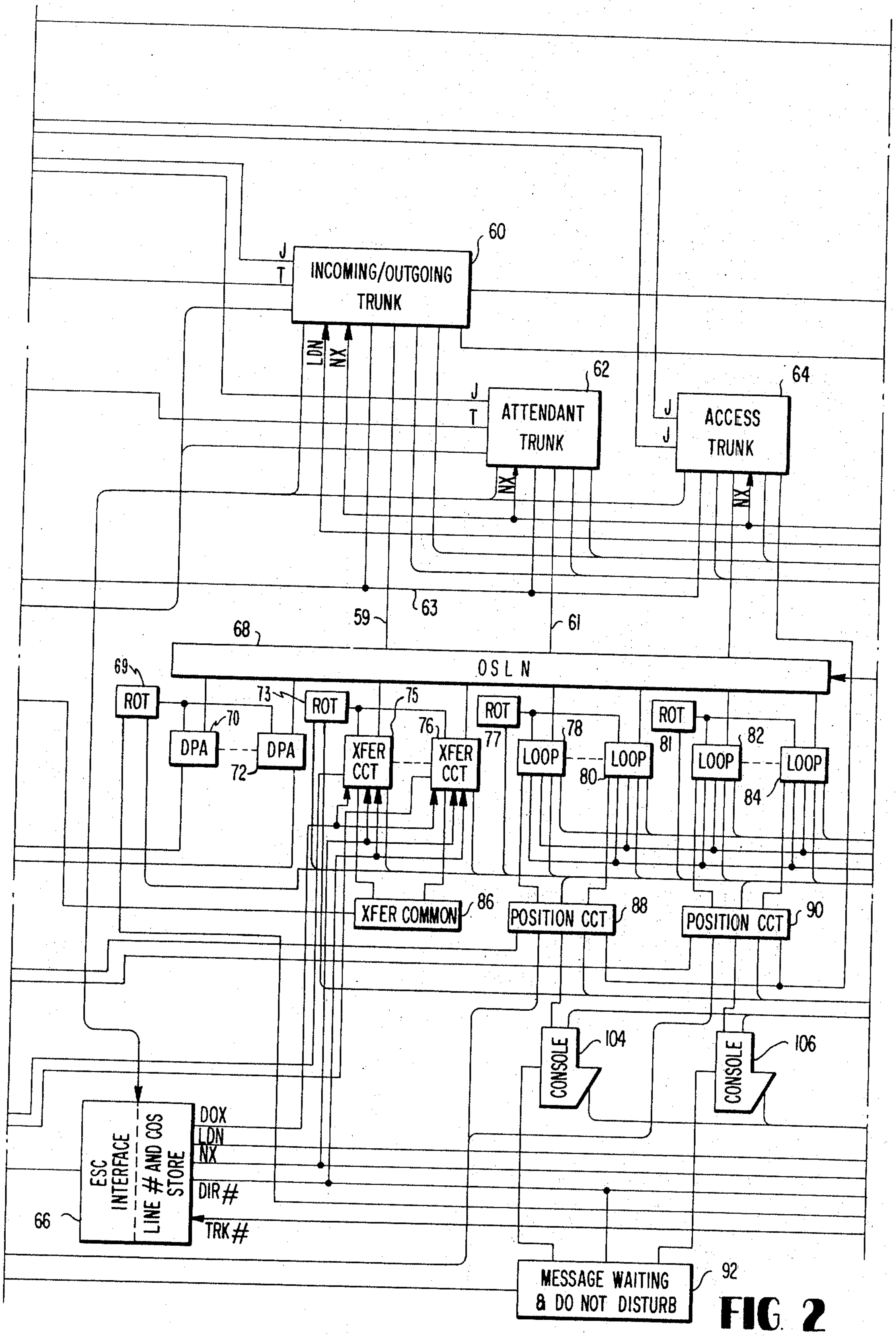
Figure 3:
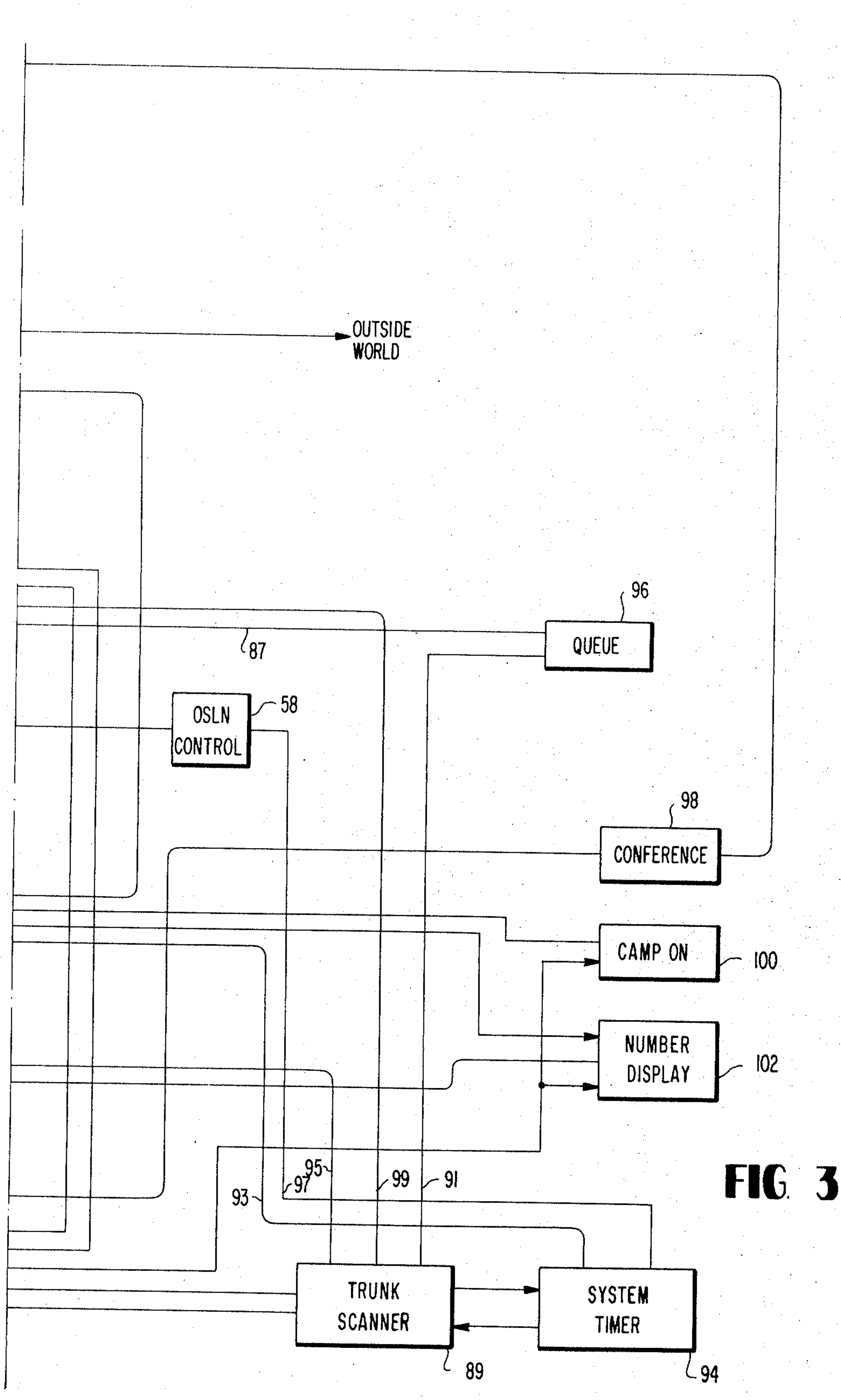

It will be seen from the drawings that FIG. 1 represents that portion of the system which relates to an electronic switching central; while, FIGS. 2 and 3 provide equipment which forms part of a private branch exchange.

Looking first to the portion of the system illustrated in FIG. 1, which provides the electronic switching center (ESC) equipment, there is included a line link network (LLN) 24 which functions as a concentrator for originating line calls and a fan out for terminating calls. The LLN consists of two stages of matrices, for example, and is used for both originating and terminating types of traffic. One end of the LLN is connected to a plurality of line circuits such as the conference line circuits 10 and 12, typical subscriber line circuits 14, 16, 18, and transfer line circuits 20 and 22. The number of subscriber line circuits provided vary in number in dependence upon the telephone service to be offered, but may typically exceed four thousand lines. The typical subscriber line circuits 14, 16, and 18 are more fully described in copending U.S. Pat. application Ser. No. 153,233, filed on June 15, 1971, by Otto Altenburger, now U.S. Pat. No. 3,708,627, issued Jan. 2, 1973, assigned to the same assignee as the present invention.

The line link network 24 provides one unique path between circuits connected to opposite ends of the network. Each of the switching networks in FIG. 1 includes matrix switches comprised of relays including a mark or control winding for initially actuating the relay and a hold or sleeve coil connected in series with its own contacts for maintaining the relay in the actuated state after a path through the network has been established. The last stage of the line link network 24 provides a termination for both originating traffic from the line circuits and incoming traffic to the line circuits. The terminating paths through the line link network to a line circuit are unique paths so that no path finding need be performed between the ringing controls 54 and 56 and a line circuit through the line link network.

The terminations for the originating paths through the line link network are connected to one of a plurality of junctors, such as junctors 26 and 28. The number of junctors and ringing controls provided depends upon the traffic requirements for the system. The ringing controls are more fully described in U.S. Pat. No. 3,671,678, issued on June 20, 1972, in the name of Otto Altenburger, which is assigned to the same assignee as the present invention. The junctor circuits 26 and 28 and the junctor control circuit 30 is more fully described in copending U.S. Pat. application Ser. No. 100,571, filed on Dec. 22, 1970, in the name of Otto Altenburger, now U.S. Pat. No. 3,705,268, issued Dec. 5, 1972, assigned to the same assignee as the present invention.

The junctors 26 and 28 serve as the focal points for all local originating traffic. The junctors include provisions for connecting the line circuits to the local registers 34 and 36 via a service link network (SLN) 32, and for providing transmission battery for calling and called parties on intraoffice calls. The junctors are under the control of the calling party. When trunk or station busy conditions are encountered, the junctors provide the busy tone to the calling party.

The service link network 32 includes two stages of matrices (P and S) and is controlled by a SLN control circuit 33 for connecting the calling line circuit via one of the junctors to one of a plurality of local registers the local registers, when connected to the junctors, provide dial tone and include apparatus for acting on the subscriber instructions. The junctors terminate on the P stage and the dial pulse acceptors (not shown) in the local registers terminate at the S stage of the service link network. The local registers include dial pulse acceptors which provide the dial tone to the calling subscriber, detect rotary dual pulses and extend the pulses to storage sections in the local registers.

The local registers also comprise a register storage and register output and a sender for providing outpulsing. The registers and senders are controlled by a register common 44 which contains the necessary control units. The local registers are connected to the register common 44 on a time division multiplex basis wherein information is passed from one equipment to another on a common bus basis. The register common 44 is also connected to communicate with a number and code translator 46 on a time division multiplex basis. The translation circuit provides information such as equipment number, ringing codes and class of service. The number and code translator 46 is connected to the line scanner-marker circuit 50 which has the means to detect service requests and means to access the individual line circuits.

The ringing controls 54 and 56 connect ringing generators to terminating or called stations, detect off-hook conditions (ring-trip) of the called station, and provide ring-back tone for the calling station. Each line circuit can be connected to any of a plurality of ringing controls which are accessed from a trunk link network (TLN) 52 so that a ringing control is automatically connected to the terminating line circuit as soon as a connection to that line is complete.

A line scanner and marker circuit 50 continuously checks the line circuits for an off-hook condition and is used for both originating and terminating types of traffic. In the event of originating traffic, the line scanner stops when an off-hook condition is detected and transmits the information from its counter circuits to a marker circuit to mark the particular line circuit and enables the SLN control 33 to initiate a path finding operation between an available local register and the line circuit requesting service. In the event of terminating traffic, the line scanner is controlled by the number and code translator 46 so as to receive an equipment number from the translator to mark the line circuit with the particular equipment location. Furthermore, in terminating traffic, the line marker is also involved in transmitting the terminating subscriber classes of service, ringing code, busy or idle status, and types of ringing required through the junctor control 30 to the ringing control 34. The line scanner-marker circuit 50 is more fully described in copending U.S. Pat. application Ser. No. 101,091, filed on Dec. 23, 1970, in the names of Gunter Neumeier and Otto Altenburger, now U.S. Pat. No. 3,699,263, issued Oct. 17, 1972, assigned to the same assignee as the present invention.

The trunk link network (TLN) 52 provides for the termination of the local traffic to local subscribers, the termination of incoming calls from other exchanges to the local subscribers, and for the connection of incoming calls from other exchanges to other external exchanges. The TLN 52 includes a three-stage network. When further expansion is necessary, another stage can also be included. A D stage of the matrix is the entrance to the TLN and is connected to the local junctors 26 and 28. An F stage is the output or exit of the TLN and is connected via the ringing controls to the line link network 24 and also to the trunk circuits.

Path finding through the trunk link network 52 is performed under the control of the TLN control 51 and the junctor control 30. The TLN control 51 and the junctor control 30 work together in completing the termination portion of a call, whether it is an internally terminated call or an outgoing call to a distant office. The number and code translator 46 and the line scanner-marker 50 are used to complete calls to local lines, and the number-code translator together with the outgoing trunk marker 48 complete calls to the trunks. The outgoing trunk marker is more fully disclosed in U.S. Pat. application Ser. No. 103,267, filed Dec. 31, 1970, in the names of Otto Altenburger and David Stoddard, now U.S. Pat. No. 3,732,377, issued May 8, 1973, assigned to the same assignee as the present application.

The path finding scheme of the TLN control 51 includes a two-step scan. The junctor has been previously marked, and furthermore, the information in the local registers is transmitted via the register common 44 to the number-code translator 46 a this time. In the event of a call terminating to a local subscriber, the number-code translator via the line scanner-marker circuit marks the line circuit of the terminating call. In the event of an outgoing call, the number-code translator via the outgoing trunk marker circuit marks the particular trunk circuit. The path finding sequences through the SLN and the TLN along with the equipment associated therewith are more fully described in copending U.S. Pat. application Ser. No. 153,221, filed on June 15, 1971, in the names of Otto Altenburger and Robert Bansemir, now U.S. Pat. No. 3,729,593, issued Apr. 24, 1973, assigned to the same assignee as the present invention.

Looking now to the portion of the system illustrated in FIGS. 2 and 3, which includes the (PBX) private branch exchange portion, five types of trunk circuits may be provided in the telephone system of the present invention; however, only an incoming/outgoing trunk 60 providing direct inward and direct outward dialing, an attendant trunk 62, and access trunk 64 are illustrated. The access trunks 64 are used solely by the operators to originate calls to the subscriber stations; while, the attendant trunks 63 are used by the local stations for access to the operator, from which they can be extended to another trunk or local station. The incoming/outgoing trunks 60 interface the telephone exchange with distant offices. Each of the incoming/outgoing trunks 60 and attendant trunks 62 have port appearances at both the originating and terminating ends of the trunk link network 52, while the access trunks 64 have two line port appearances only on the originating ends of the trunk link network. The outgoing trunk marker 48 is connected to each of the incoming/outgoing trunks 60 and attendant trunks 62 and serves to select a trunk circuit for a call originated by one of the local subscribers in response to the dialed digits as analyzed by the number and code translator 46. The incoming/outgoing trunk circuits are disclosed more fully in our copending U.S. Pat. application Ser. No. 293,571, filed Sept. 29, 1972, entitled "Trunk Circuit".

An operator service link network (OSLN) 68 controlled by an OSLN control 58 is provided for connecting the trunks 60, 62 and 64 to various service circuits such as the dial pulse acceptors 72–74, transfer circuits 74–76, and loop circuits 78–84. The operation of the OSLN 68 and the OSLN control 58 and the method of signaling through the OSLN is fully described in two copending U.S. Pat. applications entitled "Path Finding System," Ser. No. 92,593, filed Nov. 25, 1970, now U.S. Pat. No. 3,729,591, and entitled "Telephone Switching Network Signalling System," U.S. Pat. Ser. No. 92,588, filed on Nov. 25, 1970, now U.S. Pat. No. 3,707,140, both of which applications are assigned to the same assignee as the present invention. The loop circuits 78–84 are separated into two groups 78–80 and 82–84, the former being connected to an operator console 104 via a position circuit 88 and the latter being connected to another operator console 106 via a position circuit 90. The loop circuit group 78–80 and 82–84 are associated with rotaries 77 and 81, respectively, which serve to preselect an available loop for connection to the associated position circuit in preparation for a request for connection from a trunk to the operator console via its associated position circuit through the OSLN 68. The position circuits 88 and 90 are connected to the system timer forming part of the common control for the PBX portion of the system, and the position circuits are also directly connected to a dedicated incoming register, such as 40 and 42, associated with the register common 44 and number and code translator 46 in the ESC portion of the system. If it is not desired to avoid dedicating registers to any single piece of equipment as in the foregoing manner, then alternatively the position circuits 88 and 90 can be connected to the local registers such as 34 and 36 through the SLN 32 as indicated in FIG. 1 by the dashed lines. The connection of any trunks to any service circuit group is fully disclosed in our copending U.S. Pat. application entitled "Private Automatic Branch Exchange Service Circuit Complex," Ser. No. 293,750 (now U.S. Pat. No. 3,769,462 ), while operation of the position and loop circuits is fully disclosed in a copending application entitled "Operator Loop Complex," U.S. Pat. Ser. No. 293,752, both of which are filed jointly herewith and are assigned to the assignee of the present application.

The incoming/outgoing trunk circuit 60 may also be connected through the OSLN to one of several dial pulse acceptors 72–74, which, although shown separately for convenience, form part of the dedicated incoming registers 38–40, respectively. The dial pulse acceptors 72–74 are also preselected by a rotary 69 for connection through the OSLN 68 to a trunk upon request for service and are accessed by the trunk scanner 89 via the rotary 69.

The incoming/outgoing trunks 60 may also be connected through the OSLN 68 to transfer circuits such as 75 – 76, which are connected, respectively, to a dedicated transfer line circuit 20 – 22 at the input of the line link network 24. The transfer circuits are also preselected by a rotary 73 in preparation for a request for connection through the OSLN 68 to an incoming/outgoing trunk 60. The transfer operation includes the use of a transfer common 86 which is connected to the transfer circuits 75 and 76 and has a dedicated input to the service link network 32 for obtaining access to a local register 34 – 36. The transfer circuits and transfer common 86 are also connected to the system timer 94 and trunk scanner 89 via the rotary 73. The operation of the transfer circuit and transfer common is fully disclosed in a copending application entitled "Transfer Circuit," U.S. Pat. Ser. No. 293,681, filed jointly herewith and assigned to the assignee of the present application.

A queue 96 is provided in association with the incoming/outgoing trunks 60 and attendant trunks 62 to provide for servicing of requests for the operator on a first come-first served basis. The operation of the queue 96 is fully described in our copending U.S. Pat. application entitled "Queue for Electronic Telephone Exchange," Ser. No. 108,380 filed Jan. 21, 1971, now U.S. Pat. No. 3,702,380, which is assigned to the same assignee as the present application. The queue 96 is connected between each of the incoming/outgoing and attendant trunks and the trunk scanner 89 and serves to forward and trunk scanner 89 the request for operator signals as they appear at the output of the queue in conjunction with the scanning of the particular trunk by the trunk scanner 89. The trunk scanner 89 scans each of the incoming/outgoing trunks 60, attendant trunks 62, and access trunks 64 in sequential order and is stopped in its scanning on a particular trunk upon receiving a request for service signal in connection with that trunk. The request for service signal may relate to a request for a loop circuit to access an operator, a request for a transfer circuit, or the request for a DPA in connection with a direct inward dialed call. If a requested service circuit is available when the request is received in the trunk scanner 89, a stop scan signal will be generated and the request for service signal will be forwarded to the service circuit.

The system timer 94 scans each of the operator position circuits and transfer circuits in sequential order simultaneously with the more rapid scanning of the dial pulse acceptors 70 and 72. When a stop scan signal has been generated in the trunk scanner 89 and a request for service signal has been forwarded to the circuits of the type requested, the first circuit preselected by the rotary which is scanned by the system timer 94 will be seized and connection through the OSLN 68 from the trunk to the selected circuit will be effected.

The system in accordance with the present invention also provides for various special features circuits including a message-waiting-and-do-not-disturb system 92, a conference system 98, and a camp-on system 100. The camp-on system is disclosed in our U.S. Pat. Nos. 3,676,606 and 3,679,835, both being assigned to the same assignee as the present invention.

As is quite well known, an electronic switching central of the type described in connection with FIG. 1 services requests from subscriber stations and connections from the outside world to subscribers within the system by common control equipment which functions on the basis of detected conditions; accordingly, in such a system, once a connection has been established from or to a subscriber station through the system, the common control equipment releases to leave only the communication connection. However, the PBX portion of the system and its various special features circuits require certain information concerning the communication connection, such as the calling and called line circuit directory numbers, the class of service of the various parties involved and the numbers of the trunks which may be involved in the call. This type of information is not retained by the ESC portion of the system once the connection through that portion of the system is completed and so the present invention provides a PBX-ESC interface and line number store 66 which receives information concerning the subscriber line circuits and the class of service of these circuits at the time the connection through the ESC is effected so that this information may be received and stored in the PBX portion of the system for further use in connection with the special service features. For example, each time a trunk is marked for connection to a subscriber station, the data concerning the subscriber station, including the directory number and class of service thereof, will be forwarded via line 45 to the PBX-ESC interface and the line number store 66 for storage therein or for transfer into the trunk circuit itself. For example, the transfer class of service will be forwarded to the trunk circuit upon connection thereof to the subscriber station by enabling of the NX data bus from the store 66 each time a connection to a trunk is effected. In conjunction with the message-waiting-and-do-not-disturb function performed by the circuit 92, the ESC will pause prior to completing a connection to any line circuit to request of the message-waiting-and-do-not-disturb circuit 92 whether that line circuit may be in a do-not-disturb status. Signaling concerning dialed information from the number and code translator 46 and the PBX portion of the system is also effected through the PBX-ESC interface 66, such as signaling in connection with the dialing from the outside world of the listed directory number of the system by enabling the LDN lead or dialing by an inside subscriber of "0" on a transfer operation by enabling the DOX lead.

LINE-TO-OPERATOR POSITION

As in the conventional system, if a party desires communication with the operator, the digit "0" is dialed or keyed. This digit which indicates a request for the operator is detected in the number and code translator 46 after receipt in the local register 34, for example, and the translator 46 accesses the outgoing trunk marker 48 to mark an available attendant trunk 62 at the trunk output thereof. At the same time, a switch mark is extended from the register 34 to the junctor 26, for example, which accesses the junctor control 30 so that a mark is extended from the junctor to the trunk line network 52. Path finding through the trunk link network 52 is commenced under control of the TLN control 51 and the line circuit 14 is connected via the line link network 24, junctor 26, and trunk link network 52 to the attendant trunk 62.

As indicated above, at the time the trunk 62 is marked from the outgoing trunk marker 48, the translator forwards the calling party directory number, class of service and transfer data through to the ESC interface and store 66. If party A associated with the line circuit 14 does not have transfer service available, the NX bus from the ESC interface and store 66 will be enabled to store this data in the attendant trunk 62. Thus, if party A attempts to initiate a transfer operation after the junctor extends the call to the outside world, the NX data stored in the attendant trunk 62 will inhibit the attempt at transfer.

When the line circuit has been connected to the attendant trunk 62, the identifying number of the attendant trunk 62 is transferred into the queue 96 where the trunk numbers are stored in the order of receipt. When the trunk scanner 89, which continuously scans all of the incoming/outgoing trunks 60, attendant trunks 62, and access trunks 64, accesses the selected attendant trunk 62, a QRFS signal will be transferred from the attendant trunk to the queue 96 and the number of the attendant trunk 62 received from the trunk scanner 89 will be compared to the trunk number at the output of the queue 96 to determine whether that particular trunk is to be serviced next in the order of priority. If the number transmitted from the trunk scanner 89 corresponds to the number at the output of the queue 96, the queue 96 will generate a GRFS signal which is transmitted to the trunk scanner 89.

The trunk scanner 89 monitors the busy/free condition of the position circuits at all times. The position busy condition can be effected by any of several reasons such as position busy key operated, night key operated, operator busy in call, answering incoming trunk call on trunk and all loops busy. All loops busy condition is effected by the rotaries which selectively connect an available loop circuit to the associated position circuit. As soon as a loop is busy, the rotary immediately steps to the next available loop so that a loop is always preselected for connection to a requesting trunk circuit. Thus, if the rotary is continuously running, it is an indication that the loops associated therewith are all busy, but if the rotary is stationary, it is an indication that a loop is preselected and available.

An indication from the position circuits to the trunk scanner 89 that at least one position is available in conjunction with receipt of a GRFS signal from the queue 96 will result in the GRFS signal being passed on from the trunk scanner 89 from the bus 93 to all of the position circuit as an RFSGS signal. The first position circuit having an available loop and is subsequently scanned by the system timer 94 will then pass the RFSGS signal on as a mark through the loop to the operator service link network 68. As soon as the attendant trunk 62 is scanned by the trunk scanner 89, it also applies a mark on line 61 to the operator service link network 68, so that the marking of the OSLN from each side will result in a connection of the attendant trunks 62 to the selected position circuit 88 through an available loop 78, for example, upon completion of the path finding operation. The links in the OSLN are scanned automatically during the first time slot in every operator time frame whether or not a GRFS signal is generated. Thus, with the mark extended to one side of the OSLN from the trunk and to the other side thereof from the operator's loop, the loop will be connected to the calling trunk during the particular operator's time slot. Once the call is in the loop, the loop will signal the operator at the operator's console 104, for example, and the operator may connect to the trunk by depressing the associated loop key on the console. As soon as the operator is connected to the attendant trunk 62, the trunk scanner 89 releases and begins its scan of the other trunks and another free loop associated with the position circuit is preselected by the rotary.

Once a party is connected via its line circuit to the operator, the operator may switch that line to another party within the system or to the outside world.

STATION TO STATION VIA OPERATOR

Once a party has been connected to the operator and requests connection to another station within the system, the operator depresses a register key to access one of the registers, such as registers 40 and 42, which are reserved for use by the position circuits. If, on the other hand, the position circuit is connected to the SLN 32, any of the local registers 34 and 36 will be accessed. Dial tone is then received from the register, for example, and the operator dials the number of the called party to which a connection is to be established. After the last digit is dialed, the register forwards a switch mark to the attendant trunk 62 via the position circuit and loop through the OSLN to associate the junctor control with the trunk. At this time, the attendant trunk 62 accesses the junctor control 30 via the bus 63.

The translator responds to receipt of the dialed digits by accessing the line marker and scanner 50 which marks the appropriate line circuit after a busy/free check has been made. Thus, the trunk link network 52 is marked from the junctor appearance of the attendant trunk 62 on one side and by the line marker via the line circuit, line link network and ringing control on the other side. The path finding operation is begun and a path is switched through to establish a connection between the operator via the junctor output of the attendant trunk 62 to the called line circuit and via the trunk output of the attendant trunk 62 to the calling line circuit. All three parties are now connected together and may converse with one another.

The manner in which the operator releases from the loop determines whether the call will be locked in the loop (locked loop operation), or will be released from the loop (nonlocked loop operation) wherein the supervision of the call is handled therefor by the trunk circuit in the usual manner. In the locked loop operation the calling and called parties will remain connected together in the loop circuit via the attendant trunk 62. Release by either the calling or called party will only release the corresponding position of the connection while the other party will remain connected to the loop. The remaining party can hook flash for recall, in which case the operation can then establish another connection for that party. On the other hand, the remaining party may also release, causing the loop circuit to reassume the idle state.

THE CONFERENCE FACILITY

Figure 4:
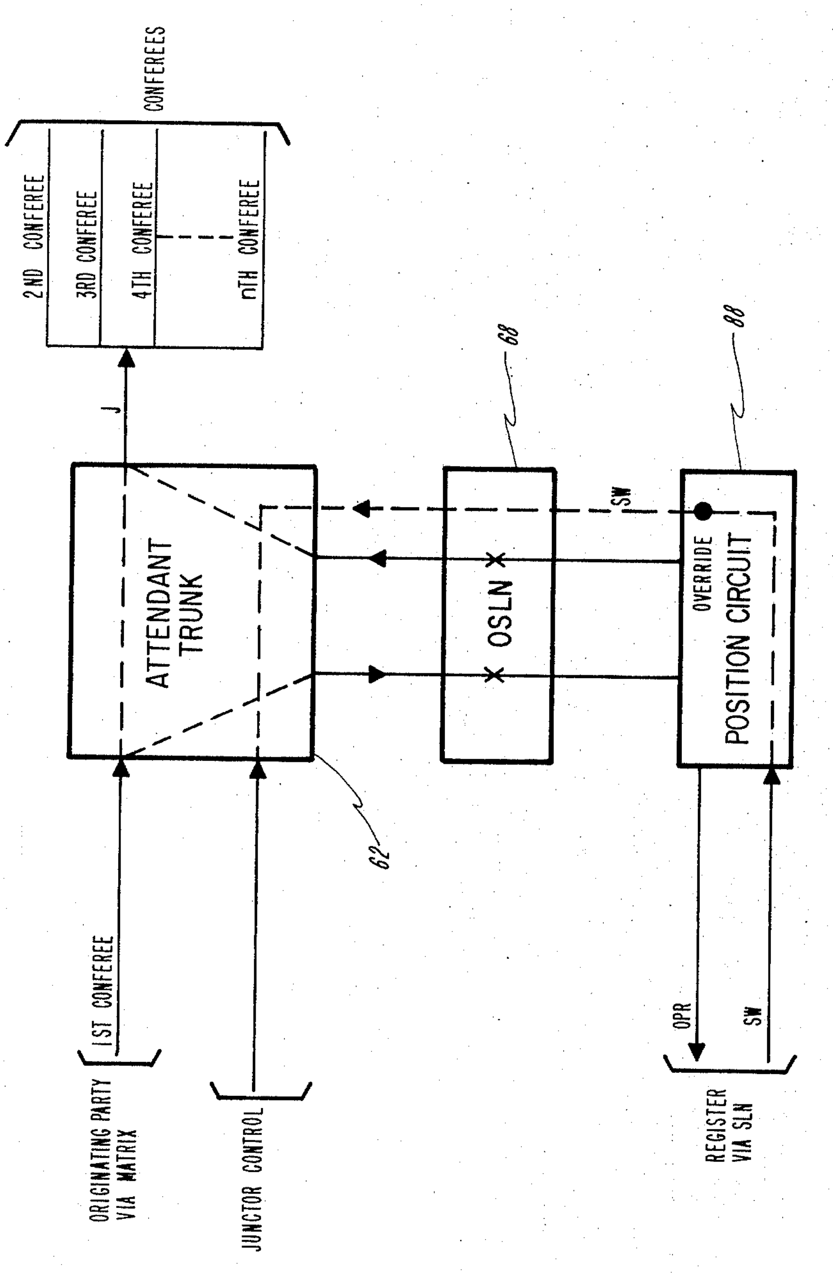
FIG. 4 is a simplified block diagram of a portion of the system of FIGS. 1–3 which is associated with the present invention.

Referring now to FIG. 4, when an originating party dials the operator, his line circuit will be connected through a junctor and the trunk link network to the trunk port of an attendant trunk 62. The trunk circuit 62 will immediately generate a request for the operator which is forwarded to the trunk scanner 89 either directly or via the queue 96 and the trunk will be connected through the operator service link network 68 and an available loop circuit to an operator position circuit as described in detail in copending U.S. Pat. application Ser. No. 293,750, filed Sept. 29, 1972, now U.S. Pat. No. 3,769,462, entitled "Private Automatic Branch Exchange Services Circuit Complex." The originating party now connected through the trunk port of the attendant trunk and the operator service link network 68 to the operator position circuit 88 can request that the operator connect him to a second party within the system. This is accomplished by the operator depressing a start key on the operator console thereby causing an operator request signal OPR to be generated and forwarded to an input of the service link network 32 which is dedicated to the particular position circuit. The operator request signal OPR will appear to the service link network as a request for a register in the same manner as a junctor circuit and the register common 44 will therefore initiate connection of an available local register, such as register 34, through the service link network 32 to the operator position circuit 88.

The operator will then dial into the register the number of the subscriber line circuit to which the originating party wishes connection. When the local register has received all of the dialed information, the number and code translator 46 will proceed to actuate the line marker/scanner 50 to mark the designated line circuit and the register will return a switch signal SW to the position circuit 88. The switch signal is forwarded from the position circuit 88 through the operator service link network 68 to the attendant trunk 62 and serves to enable a junctor relay JC in the trunk circuit to effect connection of the tip, ring, mark and sleeve leads from the trunk circuit to the junctor control to initiate connection of the junctor port of the trunk through the trunk link network and a ringing control to the marked line circuit.

Figure 5:
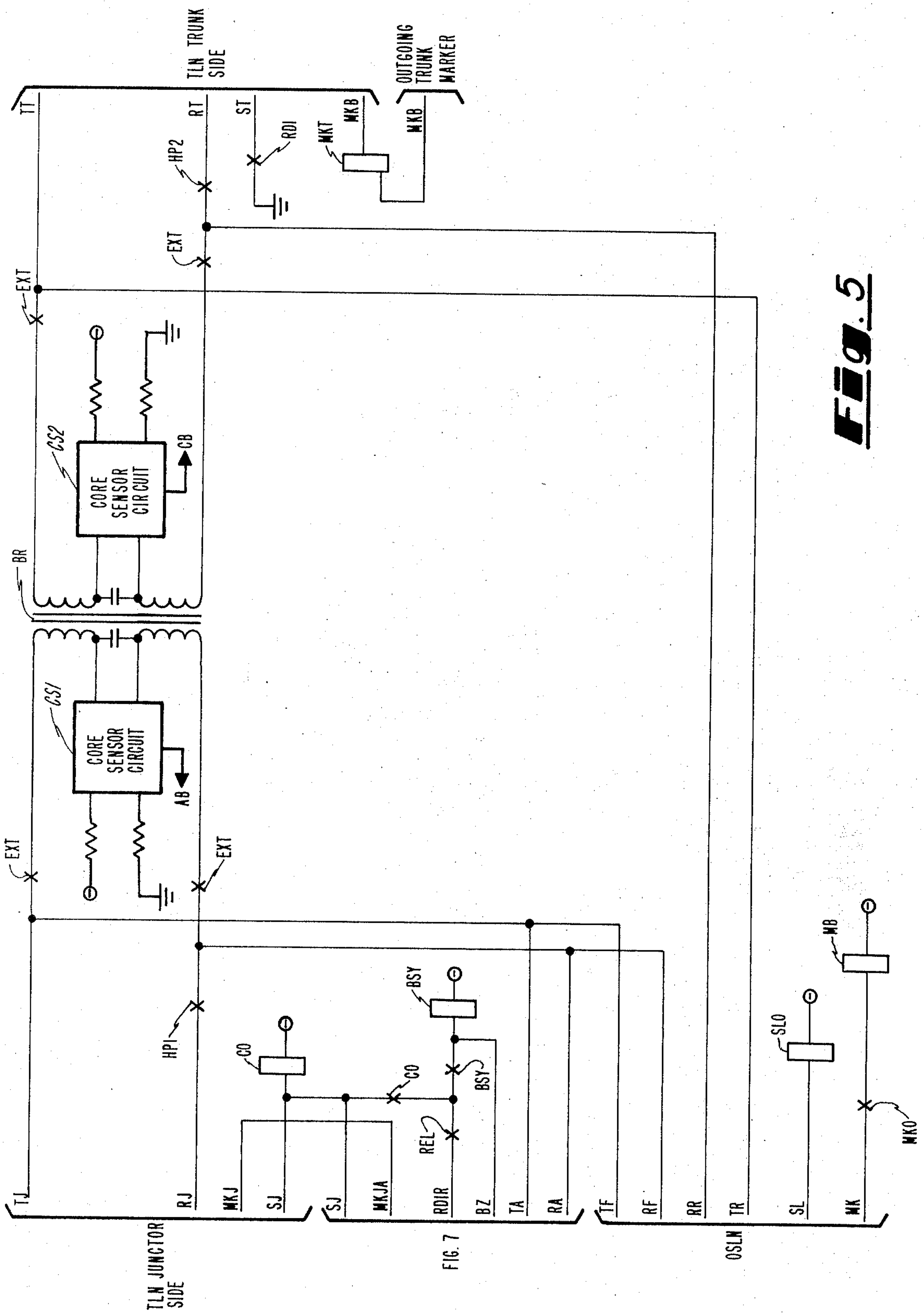
FIG. 5 is a schematic circuit diagram of a portion of the trunk circuit disclosed in the aforementioned copending application and used with the system of FIGS. 1–3.

FIG. 5 is a schematic diagram of a portion of the trunk circuit illustrating the tip and ring transmission lines TJ and RJ, the sleeve line SJ and the mark line MKJ which form the junctor port of the trunk, as well as the tip and ring lines TT and RT, the sleeve line ST and the mark line MKT which form the trunk port of the trunk circuit. The front pair of tip and ring leads TF and RF, as well as the rear pair of tip and ring leads TR and RR, extend from the trunk circuit to the operator service link network along with the sleeve line SL and mark line MK. It will be noted that the front and rear pairs of tip and ring leads are separated in the trunk circuit by the contacts of an extend relay EXT, and the transformer bridge circuit BR which provides the necessary split in the trunk enabling the operator to connect to one subscriber while retaining another subscriber on hold through the trunk circuit or to connect the two subscribers and release from the trunk circuit. The core sensors CS1 and CS2 supply battery feed voltage and monitor the loop connections. The core sensors are fully disclosed in the abovementioned copending U.S. Pat. application entitled "Trunk Circuit," Ser. No. 293,571. Contacts of an HP relay merely provide for current switching in the transmission pair prior to enabling of the other relays in the trunk system.

As also seen in FIG. 5, at the time the junctor port of the trunk circuit is connected to the trunk link network the ground on the sleeve lead will be received on lead SJ from the junctor control (FIG. 7) to operate a CO relay and extend the ground back on lead SJ to the TLN to hold the connection. At this time, the trunk will take over control of the connection by applying ground to lead RDLR through closed contacts of a relay REL (not shown) and the closed contacts of the CO relay. Operation of the CO relay in the trunk circuit thereby provides an indication that a connection has been made to the junctor port of the trunk.

The marking of the mark lead circuits and the completion of the sleeve lead circuits are described in our aforementioned copending U.S. Pat. application Ser. No. 293,571, describing the incoming/outgoing trunk circuit as utilized in the system of FIGS. 1–3. As described in connection with FIG. 11 of the copending patent application, the switch signal provided on the sleeve lead through the operator service link network to the trunk circuit from the register was applied through a gate G55 to produce a junctor request signal JC to effect connection of the trunk circuit to the junctor control requesting connection of the junctor port through the TLN to a marked line circuit. The junctor control request signal JC was applied to the base of transistor Q15 to operate the JC relay and extend the switch signal on line RQ to the junctor control. The operation of the JC relay serves to extend the lines TA, RA, SJ and MKJA from the trunk circuit to the junctor control on lines T, R, SLV and MRK. The busy line BZ is also extended to the junctor control on line BSY so that a busy condition can be forwarded to the busy relay BSY in the trunk circuit, as seen in FIG. 5.

Figure 6:
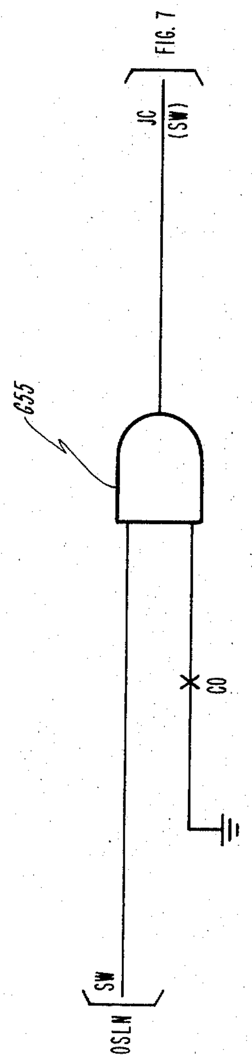
FIG. 6 is a schematic diagram of a gate arrangement previously provided in the trunk circuit of the system illustrated in FIGS. 1–3.
Figure 7:
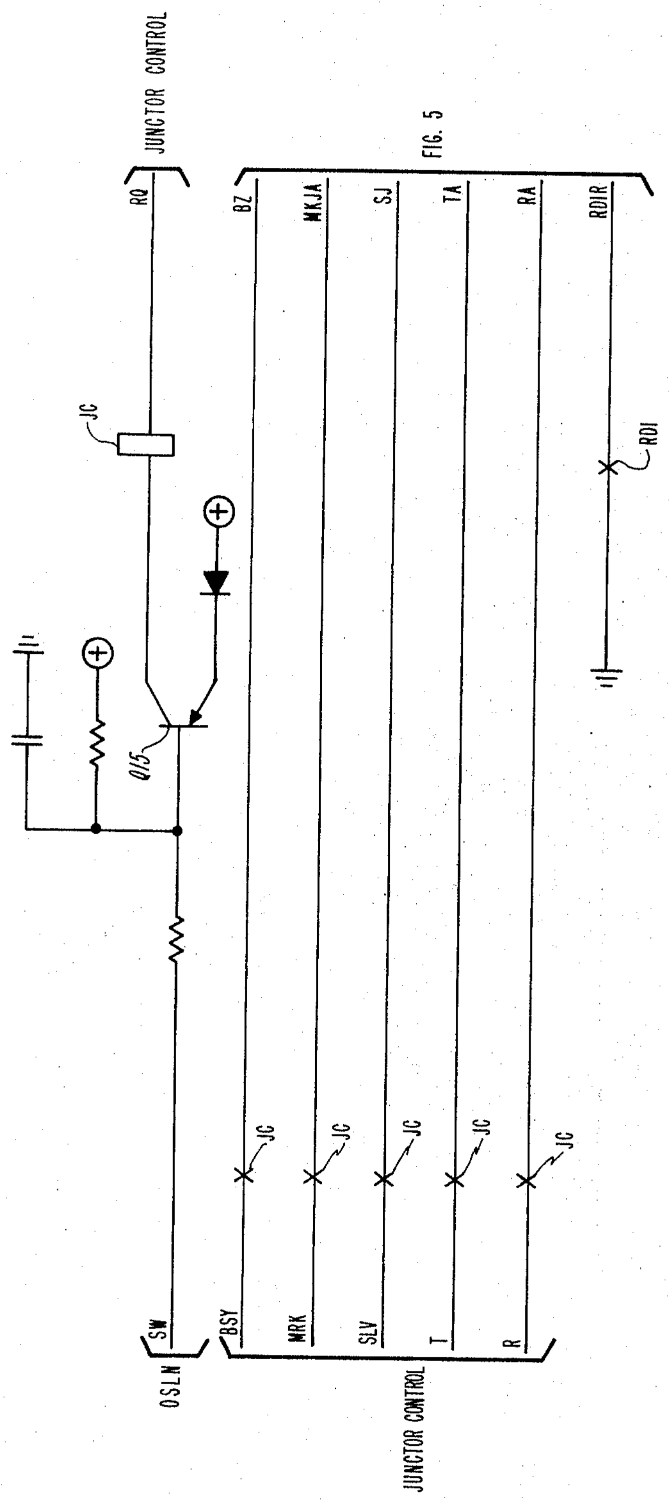
FIG. 7 is a schematic circuit diagram of another portion of the trunk circuit to which the present invention is applied.

The gate G55 in FIG. 6, which receives the switch signal forwarded through the operator service link network from the register is also subject to the condition of the CO relay in the trunk so as to be inhibited at the time the CO relay is operated by connection of the junctor port to the trunk link network. Such an arrangement would prevent the generation of the junctor control request signal JC and thereby prevent repeated connection of the trunk circuit to the junctor control to request connection of the junctor port to another subscriber. In accordance with the present invention, the gate G55 illustrated in FIG. 6 is eliminated and the switch signal SW is applied directly in control of the transistor Q15, as seen in FIG. 7 to operate the JC relay. In this way, at the time a switch signal is received through the operator service link network from a register, the JC relay will be operated connecting the trunk circuit to the junctor control and initiating the connection of the junctor port through the trunk link network to a marked line circuit. Once the switch signal ends, the register releases in the ESC and the transistor Q15 becomes non-conductive to release the JC relay, thereby disconnecting the trunk circuit from the junctor control; however, the trunk circuit is no longer inhibited from responding to a second switch signal received through the OSLN. Thus, the operator, who is still connected through her loop circuit and the OSLN to the trunk circuit, as seen in FIG. 4, can by pressing her start button obtain connection once again to a register through the service link network 32 in the ESC, dial the number of a second subscriber into the register, and receive and forward a switch signal from that register through the OSLN to the trunk circuit to once again operate the JC relay and effect connection of the trunk circuit to the junctor control. The fact that the junctor port is already connected to another subscriber line circuit does not affect the junctor control which merely sees a mark request from the trunk for connection of a marked line circuit thereto, and therefore the junctor control 30 proceeds to effect the necessary connection through the trunk link network 52 now requested by the trunk circuit.

Figure 8:
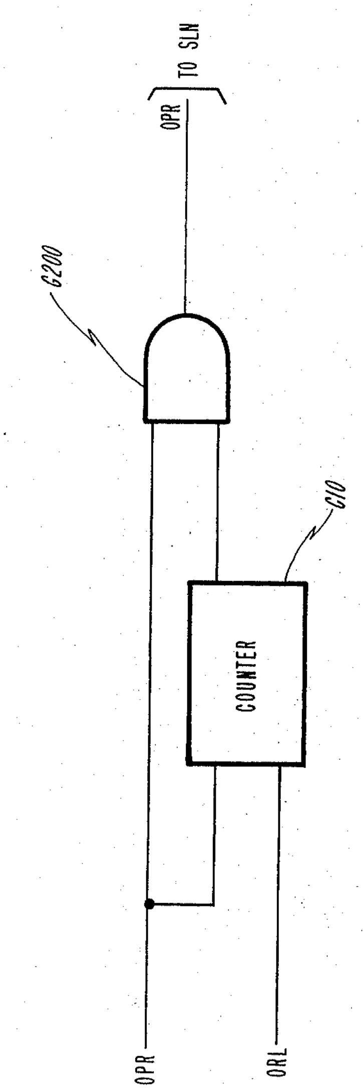
FIG. 8 is a schematic circuit diagram of a counter and gate arrangement provided in each operator position circuit for controlling the number of parties which may be successively connected by the operator to a single trunk circuit.

While a plurality of line circuits may be connected to the junctor port of the trunk circuit 62, as described in connection with FIG. 4, it will be appreciated that as the number of line circuits connected to the single port of the trunk circuit increases, the quality of the communication will vary inversely, and so it is desirable to limit the number of line circuits which may be connected to the junctor port of the trunk. This is accomplished in the operator position circuit by simply providing a counter and gate arrangement such as illustrated in FIG. 8. Each time the operator register request signal OPR is generated in the position circuit when connected to a loop by depressing the start key at the operator console, the signal OPR will be applied through a gate G200 to the operator service link network and simultaneously to one input of a counter C10. The counter C10 counts the successive operator request signals OPR generated within the position circuit and generates an output when a predetermined maximum number has been reached. The output of the counter C10 is applied to inhibit gate G200 thereby preventing further operator register requests to be forwarded from that position circuit to the service link network. The counter C10 is appropriately reset by the operator release signal ORL each time the position circuit releases from a particular loop circuit. Thereby, upon connection to a trunk circuit, the operator may successively call in a local register to effect connection of plural line circuits to the trunk circuit up to a predetermined maximum number, as determined by the counter C10.

The foregoing description of the present invention relates to the establishment of a conference between plural subscriber line circuits in association with an attendant trunk as initiated by one of the subscribers within the system; however, the same operation can be performed by the operator on her own initiative through an access trunk 64, which has two junctor ports rather than a trunk port and junctor port. In this case, the operator will first seize an access trunk from her position circuit through an available loop and key the number of one of the subscriber line circuits. The system will then effect connection of the access trunk to the designated line circuit through the TLN and a ringing control. When the subscriber answers, the operator can indicate that a conference call is being set up and depress her start button thereby placing that line circuit on hold and effecting connection from the position circuit through the SLN 32 to a local register. In the same manner as described above in connection with an attendant trunk, the operator can then sequentially effect connection of other line circuits within the system to the other junctor port of the access trunk, and upon release, the extend relay in the trunk circuit will operate to connect all of the parties in a conference connection.

As should be apparent, the conference facility in accordance with the present invention is extremely simple in that it relies upon use of that equipment already provided in the private branch exchange, the only limitation being the number of subscribers which may be connected in a conference at one time. Thus, the special feature of a conference facility can be provided in the system at little cost to the subscriber and substantially no increase in maintenance requirements.

What is claimed is:

1. In a private automatic branch exchange including a plurality of subscriber line circuits, at least one operator position circuit, a trunk link network, a plurality of junctors, a junctor control, a plurality of registers responsive to dialed indications for effecting connection of a subscriber line circuit to said trunk link network under control of said junctor control, a plurality of trunk circuits, a trunk scanner-marker circuit responsive to a request from said junctor control for connecting a selected trunk circuit to said trunk link network for connection therethrough to a subscriber line circuit, and a common control for effecting connection between said operator position circuit and a trunk circuit, the improvement comprising first means for connecting said operator position circuit to an available register to permit insertion of a dialed indication therein from an operator, second means in each trunk circuit for effecting actuation of said junctor control to connect a line circuit designated by said dialed indication from the operator through said trunk link network to said trunk circuit directly in response to a switch signal from said available register through said operator position circuit, and third means in said operator position circuit for permitting repeated application of switch signals from registers to the same trunk circuit to effect connection of more than two subscriber line circuits to a common trunk circuit.

2. An automatic private branch exchange as defined in claim 1 wherein said second means includes a relay circuit for connecting said trunk circuit to said junctor control and connection means for directly connecting said switch signal from said register to said relay circuit.

3. An automatic private branch exchange as defined in claim 2 wherein said third means includes counter means responsive to operation of said first means for limiting the number of switch signals which may be successively applied to a single trunk circuit.

4. An automatic private branch exchange as defined in claim 2 wherein said first means includes register request means for generating a register request signal, and including means for connecting said operator position circuit to an available register in response to said register request signal.

5. An automatic private branch exchange as defined in claim 4 wherein said third means includes counter means for counting said register request signals and gating means for inhibiting further register request signals when said counter means has reached a predetermined count, said counter means being reset at the time of operator release from a trunk circuit.

6. An automatic private branch exchange as defined in claim 1 wherein said third means includes counter means responsive to operation of said first means for limiting the number of switch signals which may be successively applied to a single trunk circuit.

* * * * *